United States Patent Office 3,189,554
Patented June 15, 1965

3,189,554
WATER TREATING COMPOSITION
Ralph R. Dean, 4924 Stadium Drive, Fort Worth, Tex.
No Drawing. Filed Sept. 22, 1961, Ser. No. 139,834
11 Claims. (Cl. 252—181)

This invention relates to water treatment. More particularly, this invention relates to the chemical treatment of water to prevent formation of insoluble calcium and magnesium soaps and other "hard water" ions from precipitating in systems using large quantities of water, e.g., in toilet bowls and tanks, air conditioning water systems, chill-water systems, etc. The treatment also prevents formation of rust (iron oxide) stains and scales and deposition of bacterial residues on surfaces, thereby obviating decomposition of organic wastes and the resultant odors.

"Hard water" traditionally is water from which an insoluble soap precipitates when a soluble sodium soap is added. The precipitate, in general, is a mixture of calcium and magnesium soaps. Hence, hardness in water is commonly considered to mean the total concentration of calcium and magnesium ions. These are important not only with respect to washing operations, but also the deposition of scale in boilers, condensers, and other heat exchangers and in any system in which large quantities of water are utilized.

The "softening" of water for both industrial and non-industrial use is accomplished by one or more of four major techniques: evaporation, precipitation, ion exchange and sequestration. Of these four, sequestration is particularly of interest as it is applied frequently not only as primary treatment but also as secondary conditioning following primary softening by other means. The complex phosphates have been used for many years as sequestering agents. The reaction of these phosphates with water is one of hydrolytic degradation known alternatively in the literature as hydrolysis and hydration. This reaction takes place by means of the rupture of P-O-P linkages to ultimately give the monomeric form (orthophosphate ion). This rupture is believed to always initiate very rapidly upon dissolution. However, the phosphates resulting from this first rapid scission undergo further degradation at a very much slower rate. The more slowly degradable phosphates are those commonly used in water treating operations.

Certain of the complex condensed phosphates likewise exhibit a phenomenon of rapidly gelling or hardening when suddenly immersed, or otherwise "shocked" with water. Such gels or blocks are oftentimes very slowly soluble in water and can be dissolved and removed with only difficulty. Such a property can be a mixed blessing but the action is unpredictable. This hardening is also a form of hydrolytic degradation. Several of the complex phosphates also are effective in removing iron hardness.

Surface active agents are usually defined in terms of their behavior in dilute aqueous solution. Such solutions wet surfaces readily, remove dirt, disperse solid particles, emulsify oil and grease, and produce foam when stirred or shaken. With almost every surfactant, one property predominates over the others and this property determines the general name of the compound and its field of application.

The surfactants are divided into two broad classes according to the character of their colloidal solution in water. Compounds belonging to the first class, the ionic surfactants, form ions in solution and are typical colloidal electrolytes. Compounds of the second class, known as non-ionic, do not ionize but owe their solubility to the combined effect of a number of weak solubilizing groups in their monomers. The general properties and behavior of the surfactants are due to the dual character of the molecules of these substances which are made up of two parts, a relatively large elongated part, the hydrophobic group and a small solubilizing polar group, the hydrophilic group. The antagonism of these two portions of the molecule and the balance between them gives the compound its surface active properties.

The ionic class is further divided in accordance with the way its members behave upon ionization. If the ion containing the large hydrophobic group assumes a negative charge, the compound is classified as an anionic surfactant. If, on the other hand, the reverse is true, and the ion containing the hydrophobic group takes on a positive charge, the compound is classed as cation active or cationic surfactant. The cationics are not too important as surfactants but are useful because of other properties. Surfactants, when physically mixed with water on an approximately 50–50 basis, create a stiff gel or paste which is very slowly soluble in cool water. However, one defect of these compounds is their inability to remain stiff and viscous at a temperature of about 100° F. or higher and their tendency to thereupon revert to a liquid state.

It is known to use complex phosphates and surfactants together in many applications. In the production of synthetic detergents, for example, the phosphates have been found to be useful as builders to improve the detergency of the surfactant. However, the amounts of phosphates which may be used are limited by their solubility in water. For example, the admixture of substantial amounts of complex phosphates in water oftentimes results in a substantially insoluble caked precipitate. Also, the more admixture of substantial amounts of the complex phosphates with an organic surfactant in water may result in a tendency for separation of the mixture into immiscible phases. These undesirable results have been somewhat controlled heretofore through the use of additives which, while effective, complicate the preparation and add to the final expense of the product. Furthermore, when these products have been used in the treatment of water, it has been necessary to employ mechanical devices to control the amounts of the compounds utilized.

It is therefore an object of this invention to provide a composition for effective chemical treatment of water.

It is another object of this invention to provide such composition having a simple formulation of economical and commercially available ingredients.

It is still another object of this invention to provide such a composition having a controlled rate of dissolution for use without mechanical metering devices.

It is a further object of this invention to provide such a composition which is stable, in the absence of additives, against separation and reversion of the ingredients and against substantial temperature change.

It is a still further object of this invention to provide a method for producing such compositions by which the physical properties thereof may be varied without substantially changing the proportions of the basic ingredients.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has been found that the above objects may be attained by providing a composition of substantially equal proportions of a water-soluble organic surfactant, a water-soluble inorganic builder salt and water. The resulting product is a stable intimate suspension in a generally stiff paste form, the physical properties of which may be controlled by the method of preparation as hereinafter described.

The organic surfactants may be of an anionic or nonionic nature or a blend of two or more surfactants chosen to modify the physical properties thereof. Suitable anionic surfactants include water-soluble higher alkyl aryl sulfonates such as the higher alkyl benzene sulfonates, and lower aryl sulfonates such as xylene sulfonates. These sulfonates are used in the form of their water-soluble salts such as the alkali metal salts. Examples include the sodium and potassium salts of dodecyl benzene sulfonic acid and sodium xylene sulfonate. Other anionic surfactants include the normal and secondary higher alkyl sulfate detergents, particularly those having about 8 to 18 carbons in the fatty alcohol residue, such as the sulfated alcohol from red oil, oleyl sodium sulfate, with 18 carbon atoms. The higher alkyl sulfates are used to good advantage in view of their excellent solubilization of calcium and magnesium salts, together with acceptable detergency characteristics. It is important to include sodium ions with the alkyl sulfates in order to increase solubilization of calcium and magnesium ions. Solubilization of hard water salts tends to increase with increase in chain length from about 6 to 20, while foaming tendencies tend to decrease. The alkyl sulfates may be used either singly or in conjunction with other surfactants in order to achieve specific results. Examples of other organic anionic surfactants include alkyl esters of sodium sulfosuccinic acid, tall oil fatty acids and neutralized salts thereof.

Examples of suitable non-ionic surfactants are water-soluble non-ionic polyalkylene oxide derivatives. In general, these are products prepared by the introduction of a controlled number of alkylene oxide groups into an organic hydrophobic compound or group, usually of an aliphatic or aromatic structure. It is preferred to use the polyoxyethylene condensates derived from ethylene oxide, although other lower alkylene oxides may be substituted therefor. Among the preferred compounds are the polyalkylene oxide condensates of alkyl phenols such as the polyoxyethylene ether thereof. Further suitable surfactants include the polyoxyalkylene esters of organic acids such as the higher fatty acids, rosin acids, or tall oil acids.

Other non-ionic surfactants such as fatty acid amide condensates and higher fatty acid alkanolamides may be substituted or blended with the polyoxyethylene esters, in each case the criterion being efficient gelling and surfactant characteristics.

The water-soluble inorganic builder salts which are preferred are the inorganic polyphosphate salts. These complex or molecularly hydrated polyphosphates are preferably used in the form of the normal or completely neutralized salt, e.g., sodium tripolyphosphate. It is preferred to employ the alkali metal polyphosphates, and particularly the sodium salts, for optimum effects. These suitable polyphosphate materials include sodium hexametaphosphate, sodium tetraphosphate and tetrasodium pyrophosphate. Other slowly soluble phosphates may be used but the above are preferred.

When approximately equal parts of surfactants and phosphates, the latter in powder form, are blended with a third approximately equal amount of water, the resulting product is a stiff, slowly soluble paste or gel which becomes more viscous after a few days standing time. The amounts of ingredients may be varied up to 10% by weight without seriously affecting the desirable properties of the product, but it is preferred not to vary the amounts more than 5% by weight. The paste is resistant to temperature changes; in fact, it can be heated to a temperature within the range of 120° to 130° F. indefinitely without liquefying or otherwise exhibiting adverse properties. This stability is advantageous in connection with packaging, shipping and usage. Surfactants and phosphates each share the water with the other, the water becoming a "coupler," actually locking the two components together into a permanent product. This tends to effect uniform dissolution of the product in water. The viscous blend of surfactant, phosphate and water prevents complete rapid reversion of the complex phosphate to the orthophosphate form which is of little or no use for the purposes of this invention. The gelatinous, colloidal nature of the hydrated surfactant coats the phosphate particles which are only partly hydrated, thereby preventing complete solution and reversion during preparation.

The paste is irreversible, and being a composite or organic-inorganic materials, is an effective "mother" compound into which additives may effectively be incorporated for use in various applications. In most cases the overall effect is one of proper solubility, penetration, reaction, etc., in hydrophobic as well as hydrophilic media, both organic and inorganic. A saving in cost is effected by use of a mixture of approximately equal amounts of phosphate and surfactant, since a synergistic effect boosts the overall efficiency.

The pH of the water treating composition is preferably between 7 and 10. However, efficiency may be achieved when the pH ranges from about 6 to 12. The values are determined upon an approximately 2% aqueous solution and the pH may be adjusted as desired with, for example, sodium hydroxide or phosphoric acid.

In preparation of the water treating composition of this invention, the complex phosphates are screened and dry-mixed to remove any lumps. If a non-ionic surfactant is used, it is added directly to the phosphate material. This procedure serves to "lubricate" the individual phosphate particles thereby retarding hydration and hardening of the phosphate when the water is added. After addition of the water, the ingredients are thoroughly mixed for from 3 to 5 minutes. Of an anionic surfactant is used, it is first incorporated with the water and the solution is added rapidly to the phosphate material with continuous mixing for from 3 to 5 minutes. In either case, the mixture assumes a smooth creamy appearance and is ready to package.

The mixing procedure is preferably such as to avoid any entrapment of air, thereby giving optimum density of about 9.24 pounds per gallon. The slowest speed, No. 1 on a Sunbeam Mixmaster, was found to be ideal in laboratory work. The mixing should be thorough and provide for uniform distribution of the ingredients throughout.

The temperature during mixing is an important consideration. Temperatures which are too low tend to solidify the materials too quickly and give an inadequate milling for intimate mixture. On the other hand, temperatures which are too high tend to "melt" the anionic surfactant or water and non-ionic surfactant mixture such that they are unable to effectively coat the phosphate particles. This may result in the formation of large non-redispersable phosphate lumps which separate from the mixture. In either case, the final product does not properly form a gel or paste and in use dissolves erratically and rapidly. The preferred mixing temperatures range between 75° and 125° F. The optimum temperature is about 100° F. and gives excellent dispersion and hydration of the phosphate particles yielding a dense creamy compound which sets up into a stiff brick in a few minutes. The temperature rises rapidly toward the end of the mixing and should be controlled. The viscosity of the mixture ranges from approximately 2000 centipoises during the mixing operation to several thousand centipoises after it has set. The paste then becomes very firm and nonpourable.

The physical properties of the resulting gel may be controlled by varying the mixing procedure and/or by proper selection of the particular surfactant, phosphate or mixture which is used. For example, the gel may be made to dissolve more rapidly by use of the more soluble phosphates such as sodium hexametaphosphate. Incomplete coating of the phosphate particles with surfactant and/or mixing the ingredients at the higher end of the temperature range also tends to increase the rate of dissolution.

The detergency characteristics of the product may be influenced by selection of the surfactant. An increase of anionic surfactant, together with the decrease of non-ionic, will favor detergency at the expense of firmness. Use of the more soluble phosphates will also favor detergency.

The sequestering ability is controlled by proper selection of phosphate ingredients. The more soluble phosphates produce greater removal of calcium and magnesium ions, while increase in the less soluble phosphates, for example tetrasodium pyrophosphate, favors removal of iron as well as other ions, and still controls calcium and magnesium removal by means of "threshold" sequestration. This is a phenomenon by which only a fraction of the theoretical requirement of phosphates and surfactants will condition troublesome ions so that they will be temporarily held in abeyance and prevented from precipitation. When precipitation does occur, the particles are non-adherent and easily removed. This is especially effective in "once-through" systems of water usage. Therefore, the preferred phosphates for advancing sequestration are sodium tripolyphosphate and tetrasodium pyrophosphate as opposed to hexametaphosphate and other of the more soluble complex phosphates.

The iron sequestration value of tetrasodium pyrophosphate can be stepped up by inclusion of a small percentage (1–5% by weight) of organic sequestrants such as an isomeric mixture of polyhydroxy isoheptonates and derivatives of glucoheptonic acid and other sugar acids from the polysaccharides. Ordinarily these sequestrants are not too compatible and effective with phosphates subject to rapid reversion, but tetrasodium pyrophosphate and sodium tripolyphosphate appear to give a synergistic effect with them, especially the former in connection with the ferric ion. Such results are obtained at an alkaline pH.

It has been found also that inclusion of a small percentage of tall oil fatty acids or oleic acid will attract ferric ions and form metallic soaps, e.g., ferric tallate or ferric oleate. Such soaps are water-insoluble but are dispersed and conditioned so that precipitation and adhesion are delayed indefinitely if not prevented. The soaps may be used in amounts from 1 to 5% by weight. This inclusion, of course, would be for areas in which "red water," containing ferric bicarbonate is troublesome.

The dispersion (peptization, deflocculation) of solid particles is favored by use of sodium tripolyphosphate especially, aided greatly by the penetrating and wetting action of either anionic or non-ionic surfactants, especially in conjunction with one another. It is rather well known that a mixture of the two types of surfactants will penetrate, disperse and emulsify better than either separately. Therefore, sodium tripolyphosphate plus tetrasodium pyrophosphate, together with the proper blend of surfactants, gives an almost perfect combination for the dispersion of masses. Each ingredient also possesses a great degree of ability to prevent re-deposition of soil (grease, dirt, bacteria, etc.) on the cleaned surface. This prevention of re-deposition can be bolstered by addition of sodium carboxymethyl cellulose, or similar colloidal material, which not only prevents re-deposition of soil, but, being a colloidal material, removes ferric ions from solution, apparently by sequestration or similar activity. From 1 to 5% by weight of carboxymethyl cellulose may be used to advantage.

Foaming is not necessarily desirable in the composition of this invention and can be controlled in different ways. One method is to use a non-ionic tall oil surfactant which is traditionally a low-foamer, such as the polyoxyethylene esters of mixed tall oil acids. Such non-ionic surfactants are very good in other properties such as reduction of surface tension, emulsification and hydration to form a gel. An anti-foam such as silicone may be incorporated, but such is not considered necessary except under rare circumstances. Anionic hydrotropes such as sodium xylene sulfonate can be used to replace the alkyl aryl sulfonate, thereby reducing foam still further, with little change in properties.

The firm, smooth gel of this invention provides uniform, balanced solubility or hydration of the components, thereby effecting increased efficiency in conditioning water. The phosphate particles are properly coated with a partially hydrated film of surfactant, each of which tends to separate the other, providing a controlled rate of solution of each ingredient throughout a cycle of several weeks. The balance, or ratio, of ingredients is almost identical throughout, and the compound simulates the accurate proportioning quality of a mechanical device. For example, one pound of the gel requires approximately one month to dissolve when immersed in the flush tank of an average toilet. Random tests on water in stool analyze about 2 to 4 p.p.m. phosphate. This slow, controlled dissolution provides "automatic" water treatment without using mechanical metering devices. The dissolution may be maintained at an exact rate for up to three months and more.

The product of this invention, because of the nature of its ingredients, actually deposits a thin chemical "film" over the treated surfaces and as long as the film is present, deposits of scale, rust, body wastes, etc., are unable permanently to attach themselves to the substrate or surface involved. This is a rather well known phenomenon of surface chemistry. The "film" repels other materials by its colloidal, non-ionic, sequestering action. The composition also disperses and/or peptizes particles of waste and chemical compounds, reducing them to infinitesimal size, thereby causing them to become suspended in water instead of precipitated. Such peptized or suspended particles at this stage begin to repel each other since they are of similar electrical charge, which aids in preventing precipitation and attachment.

The ingredients of the composition produce a "synergistic" effect in water treatment, the term herein meaning a total efficiency greater than the sum of the individual efficiencies. This is especially true in this case of "threshold" inhibition of hard water to effect proper control of calcium, magnesium and ferric (ous) ions. The composition may be modified by addition of certain quaternary ammonium (cationic) compounds to control odors in cooling waters for air conditioning, etc. Such additives would also be suitable for algae and slime control. Sodium borate (1–5%) is effective as an additive also, for algae and slime control.

The composition also, by virtue of its excellent surface active properties (penetration, wetting, dispersing) causes rapid disintegration in sewer lines of body waste, paper, etc., thereby eliminating frequent stoppage of the lines. The composition is non-toxic and the ingredients are beneficial to plant and animal life when introduced into a sewer or river. Consistent use aids in the prevention of disease by continuous detergency and removal of offensive material.

In the following examples and throughout the specification and claims, all parts are parts by weight unless otherwise specified.

*Example 1*

| Ingredient: | Parts by weight |
|---|---|
| Tergitol NPX | 50 |
| Sodium hexametaphosphate | 50 |
| Water | 50 |

The sodium hexametaphosphate was screened and dry-mixed to remove lumps. The Tergitol NPX, which is an alkyl phenyl polyethylene glycol ether available from Union Carbide Chemicals Company, a division of Union Carbide Corporation, was then added to the phosphate and thoroughly dispersed to coat the phosphate particles. The water was then added and the mixture stirred for about 5 minutes. The temperature was prevented from rising substantially above 100° F. by use of a water bath. After setting, the mixture was a firm, stiff gel.

*Example 2*

| Ingredient: | Parts by weight |
|---|---|
| Triton X–100 | 40 |
| Pilot HD 90 | 10 |
| Sodium tripolyphosphate | 20 |
| Sodium hexametaphosphate | 20 |
| Sodium tetraphosphate | 10 |
| Water | 50 |

The phosphates were screened and dry-mixed to remove lumps. The Triton X–100, which is iso-octyl phenoxy polyethoxy ethanol available from Rohm and Haas Company, was added to the phosphates and thoroughly dispersed. The Pilot HD 90, a flaked sodium alkyl aryl sulfonate available from the Pilot Company, was mixed with the water. The solution was added to the phosphates and the mixture stirred for about 4 minutes with temperature control.

*Example 3*

| Ingredient: | Parts by weight |
|---|---|
| Renex 20 | 50 |
| Tetrasodium pyrophosphate | 50 |
| Water | 50 |

The ingredients were mixed according to the procedure outlined in Example 1. Renex 20 is a poly oxyethylene ester of mixed tall oil acids available from the Atlas Powder Company.

*Example 4*

| Ingredient: | Parts by weight |
|---|---|
| Sodium tripolyphosphate | 250 |
| Tetrasodium pyrophosphate | 250 |
| Aerosol AY | 380 |
| Sodium carboxymethyl cellulose | 20 |
| Igepon TK | 100 |
| Water | 500 |

The ingredients were mixed according to the procedure outlined in Example 2. The sodium carboxymethyl cellulose is added to the dry phosphates and mixed prior to addition of liquids. Aerosol AY is diamyl sodium sulfosuccinate available from American Cyanamid Co. and Igepon TK is a fatty methyl taurate available from Antara Chemicals.

What is claimed is:

1. A stiff non-pourable water treating composition for inhibiting the deposition of scale on surfaces contacted by said water consisting essentially of a water-soluble surfactant selected from the group consisting of an anionic organic surfactant selected from the group consisting of an alkyl aryl sulfonate, an aryl sulfonate, an alkyl sulfate, an alkyl ester of sodium sulfosuccinic acid, tall oil fatty acids and neutralized salts thereof, and mixtures thereof, a non-ionic organic surfactant and mixtures thereof, a substantially equal proportion by weight of a water-soluble inorganic polyphosphate in particulate form and a third substantially equal proportion by weight of water, the amount of said polyphosphate being in excess of its normal solubility in the amount of water present and maintained in a non-caking suspension by means of a thin, evenly dispersed coating of the surfactant on the particles of said polyphosphate.

2. The composition according to claim 1 wherein the surfactants are used in the form of their alkali metal salts.

3. The composition according to claim 1 wherein the non-ionic surfactant is selected from the group consisting of a polyethylene oxide condensate of an alkyl phenol, a polyoxyethylene ester of an organic acid and mixtures thereof.

4. The composition according to claim 1 wherein the polyphosphates are in the form of their alkali metal salts.

5. The composition according to claim 4 wherein the salts are selected from the group consisting of sodium tripolyphosphate, sodium hexametaphosphate, tetrasodium pyrophosphate, sodium tetraphosphate and mixtures thereof.

6. The composition according to claim 1 having a pH between 6 and 12, said pH determined on an approximately 2% aqueous solution.

7. The composition according to claim 6 having a pH between 7 and 10.

8. A method for preparation of a water treating composition which comprises reducing a water-soluble inorganic polyphosphate to particulate form, adding to said polyphosphate a substantially equal proportion by weight of a water-soluble surfactant selected from the group consisting of an anionic organic surfactant selected from the group consisting of an alkyl aryl sulfonate, an aryl sulfonate, an alkyl sulfate, an alkyl ester of sodium sulfosuccinic acid, tall oil fatty acids and neutralized salts thereof and mixtures thereof, a non-ionic organic surfactant and mixtures thereof, and a third substantially equal proportion by weight of water, stirring the mixture for from 3 to 5 minutes with no substantial inclusion of air to disperse the surfactant evenly and to coat the particles of said polyphosphate therewith.

9. The method according to claim 8 wherein the surfactant is non-ionic and said surfactant is added to the polyphosphate prior to incorporation of the water.

10. The method according to claim 8 wherein the surfactant is anionic and said surfactant is dissolved in the water prior to addition to the polyphosphate.

11. The method according to claim 8 wherein the temperature of the mixture is controlled so as not to rise substantially above 100° F. during mixing.

References Cited by the Examiner

UNITED STATES PATENTS 2,592,511   4/52   Chittum _____ 252—8.55 XR
2,934,503   4/60   Chittum _____ 252—181

JULIUS GREENWALD, *Primary Examiner.*